A. A. WELLS.
PROCESS OF AND APPARATUS FOR DECOMPOSING HYDROCARBON OILS.
APPLICATION FILED JULY 18, 1913.
1,248,225.
Patented Nov. 27, 1917.
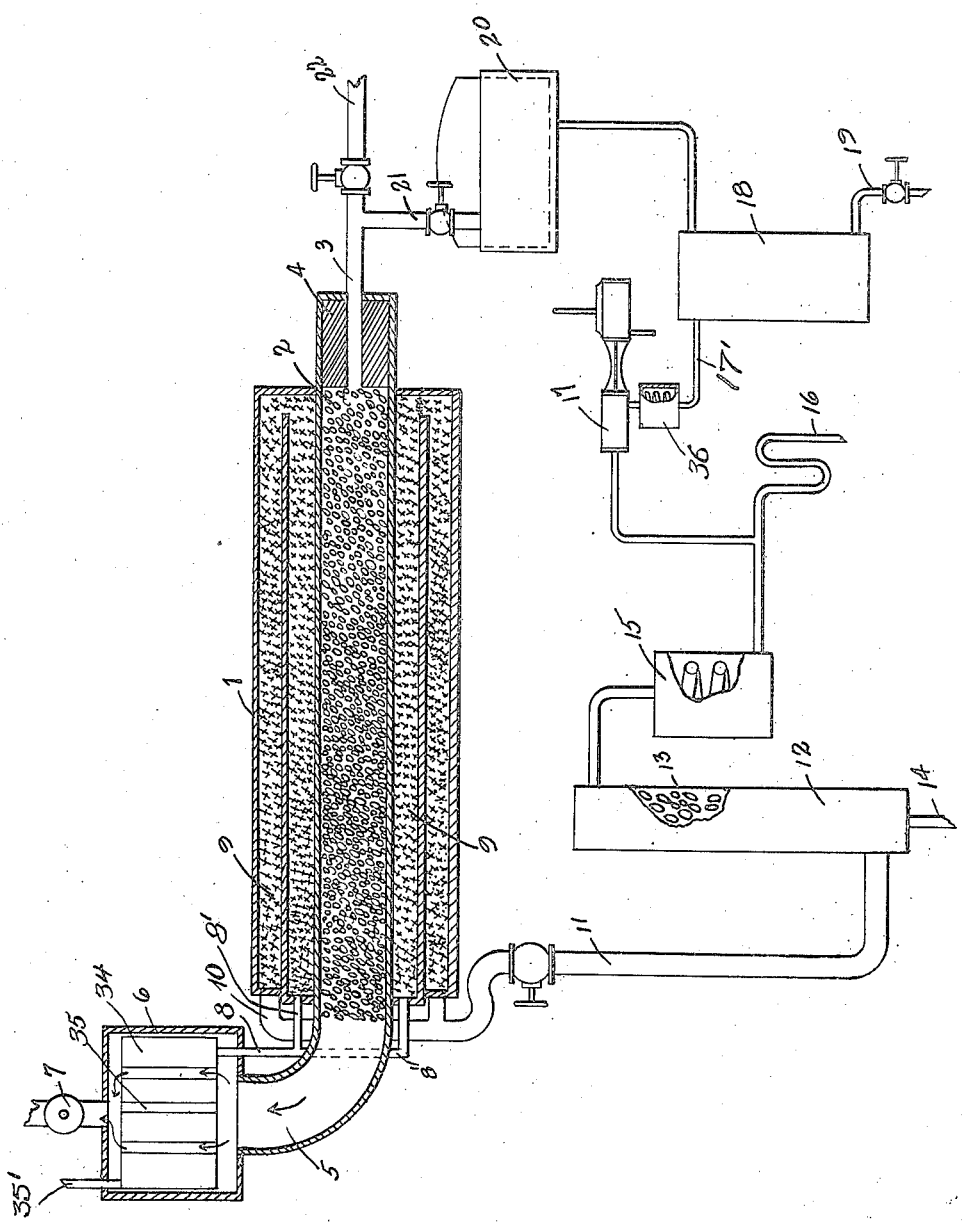
ATTEST:
INVENTOR:

UNITED STATES PATENT OFFICE.

ALFRED A. WELLS, OF MONTCLAIR, NEW JERSEY, ASSIGNOR TO ELLIS-FOSTER COMPANY, A CORPORATION OF NEW JERSEY.

PROCESS OF AND APPARATUS FOR DECOMPOSING HYDROCARBON-OILS.

1,248,225.   Specification of Letters Patent.   Patented Nov. 27, 1917.

Application filed July 18, 1913. Serial No. 779,709.

*To all whom it may concern:*

Be it known that I, ALFRED A. WELLS, a citizen of the United States, and a resident of Montclair, in the county of Essex and State of New Jersey, have invented certain new and useful Improvements in the Processes of and Apparatus for Decomposing Hydrocarbon-Oils, of which the following is a specification.

This invention relates to a method of breaking down kerosene and heavy petroleum oils to form light petroleum products such as gasolene and similar volatile compounds and relates in part to special heating methods whereby the heat energy put into the system is most effectively utilized.

In the accompanying drawings which are simply illustratively diagrammatic, the figure shows partly in section and partly in elevation a heating apparatus and appurtenances of a character to be hereinafter described in detail.

In the drawings 1 is a heating chamber having a mass of refractory granular material on which impinges a mixture of combustible gas and air which is delivered to the apparatus by the pipe 3. 4 is a thimble through which the gas and air mixture enters the tubular chamber containing the refractory material 2. 5 is an outlet for the waste products of combustion leading to the preheater 6, the gases being drawn through this preheater by the pump 7. Oil is fed to the preheater in order to bring the temperature of the oil to as high a temperature as is possible prior to passing the oil into the reaction chamber. The numeral 34 designates an inner shell or chamber of the preheater, having flues 35 for the passage of the heated gases, as shown. The oil is fed into the preheater by a pipe 35', as shown. 8 is an oil pipe leading from the preheater chamber 34, and having branches 8', which lead to an annular double jacket surrounding a central heating section, which annular passage 9 is preferably filled as shown with cross pieces of metal preferably jackstones preferably coated with catalytic material such as nickel. 10 is a discharge pipe for the treated oils and vapors connected by the conduit 11 to the hydrogenating chamber 12 in which is placed the nickel material or other suitable catalytic material maintained at a temperature preferably at about 240° C. while the hydrogen is passed therethrough.

It will be understood that the use of the refractory granular material 2 not only permits a temperature far in excess of the decomposing temperature of the material under treatment to be obtained but that, by holding the heat imparted to it, rapid changes in temperature within the central and annular tubes or passages in the heating chamber 1 are avoided and substantially uniform temperatures throughout the different portions of the heating zone are maintained. The chamber 12 has a pipe 14 connected therewith, to supply hydrogen thereto.

This treatment improves the products with regard to odor, color, and stability. 15 is a condenser and 16 a draw-off for the condensed material. A gas outlet pipe leads to the pump 17 where the gases with the entrained vapors are put under compression and pass through a pipe 17' and condenser 36 connected therein, to the separator 18 where the liquid products are removed by the draw-off 19; the residual gas passes to the holder 20 and is ultimately burned in and among the refractory material 2.

The apparatus 12 may be omitted if desired, or it may be inserted at a later point in the path of travel of the vapors. The crude gasolene obtained by this operation without hydrogen is rather dark in color and has a slightly unpleasant odor in addition to containing bodies which polymerize with great ease and which are therefore undesirable. The gasolene is therefore preferably passed with hydrogen over nickel or other contacting material which causes the separation of the gasolene to a greater or less degree improving the odor, color and stability.

Some of the vapors are hard to condense and compression enables the recovery of very volatile hydrocarbons which would otherwise escape. Among these are certain highly unsaturated hydrocarbons having an iodin number ranging from 300 to 500 or thereabout and are polymerized or undergo peculiar changes with great readiness whereby solid bodies are formed some of these having the consistency of vaseline or soft wax and others being of a resinous nature. This action takes place particularly with products boiling up to 215° C.

In taking out the more volatile entrained bodies by compression the temperature of the gases is of course suitably reduced and a pressure ranging from 25 to 100 atmospheres, more or less, is maintained.

By this process a gasolene substitute is obtained which is free from the objection to many products made by ordinary cracking processes and it is light in color, water white if desired, has a not unpleasant odor and is stable so that oxidation does not take place when exposed to the air to any material extent and when placed in carbureter of internal combustion engines gumming up of the cylinders of the engine and carbureter through the formation of resinous products does not occur to any undesirable extent.

To recapitulate, my invention broadly relates to the treatment of kerosene oil or heavier oils to form light products such as a gasolene substitute having approximately the same flash point of gasolene, but oftentimes being of greater specific gravity, the treatment consisting in or comprising passing an explosive mixture of gas and air, preferably gas derived in part from the operation of the present process, through a mass of granular refractory material, whereby intense combustion is secured and in passing about such a central heating source the vapors of oil such as kerosene so as to cause the latter to break down into lighter products; in regulating the flow of the vapors with respect to the temperature of the source of heat so that the breaking down process goes on uniformly with a maximum production of the desired gasolene like bodies, in collecting the vapors and gases separating the condensable materials as far as possible from the gaseous bodies, returning the gaseous bodies to the system and burning same, and in rectifying or purifying the condensed products.

What I claim is:

1. The herein described process of producing gasolene or a gasolene-like material which consists in heating a mass of more or less finely divided refractory material in an elongated inclosing receptacle, subjecting a liquid hydrocarbon having a substantially higher boiling point than gasolene to the action of a decomposing heat by passing such liquid hydrocarbon longitudinally and in opposite directions through a permeable mass of metal arranged about and contacting with the elongated inclosing receptacle to receive heat therefrom and decreasing in temperature outwardly, and recovering the gasolene or gasolene-like material produced.

2. The herein described process of producing gasolene or gasolene-like material which consists in heating a mass of more or less finely divided refractory material in an elongated inclosing receptacle, subjecting a liquid hydrocarbon having a substantially higher boiling point than gasolene to the action of a decomposing heat by first passing such liquid hydrocarbon longitudinally through the inner portion of a permeable mass of metal arranged about and contacting with the elongated inclosing receptacle to receive heat therefrom and decreasing in temperature outwardly, and then passing the liquid hydrocarbon longitudinally through the outer portion of the mass of permeable metal, and recovering the gasolene or gasolene-like material produced.

3. In apparatus of the character described, a heating tube, a filling of more or less finely divided refractory material for the heating tube, means for heating the refractory material, an outer shell surrounding the heating tube and extending for the greater portion of the length thereof, an annular deflecting member arranged between the heating tube and the outer shell and spaced therefrom and having one end connected with the corresponding end of the outer shell and its opposite end spaced from the opposite corresponding end of the outer shell, a filling of permeable metal arranged within the outer shell upon inner and outer sides of the annular deflecting member, means for introducing a liquid hydrocarbon into one end of the outer shell inwardly of the annular deflector, and draw-off means for the products of decomposition connected with the same end of the outer shell outwardly of the annular deflector.

Signed at Montclair, in the county of Essex and State of New Jersey, this 15th day of July, A. D. 1913.

ALFRED A. WELLS.

Witnesses:
I. DAVID LUBSTSKA,
W. O. HENKE.